Feb. 26, 1957  J. WITHERSPOON, JR  2,783,333
CONTROL DEVICE
Filed March 3, 1954  3 Sheets-Sheet 1

INVENTOR.
Jack Witherspoon Jr.
BY
HIS ATTORNEY

INVENTOR.
Jack Witherspoon Jr.
BY
Albert J. Henderson
HIS ATTORNEY

Feb. 26, 1957  J. WITHERSPOON, JR  2,783,333
CONTROL DEVICE
Filed March 3, 1954  3 Sheets-Sheet 3

INVENTOR.
Jack Witherspoon Jr.
BY
HIS ATTORNEY

United States Patent Office 2,783,333
Patented Feb. 26, 1957

2,783,333
CONTROL DEVICE

Jack Witherspoon, Jr., Knoxville, Tenn., assignor to Robertshaw-Fulton Controls Company, Greensburg, Pa., a corporation of Delaware Application March 3, 1954, Serial No. 413,934

12 Claims. (Cl. 200—140)

This invention relates to control devices and more particularly to thermostatic controls adapted to be mounted on a wall by means of a junction box.

An object of this invention is to mount a housing containing a thermostatic control device on a junction box by means accessible from the exterior of the housing but invisible under normal operating conditions.

Another object of this invention is to eliminate the necessity for removing a thermostat housing in order to mount the thermostat on a supporting structure.

Another object of this invention is to utilize a temperature setting dial for hiding the mounting means of a thermostatic control device.

Another object of this invention is to arrange an apertured temperature setting dial and a lever system including an apertured lever on a base plate so that the apertures therein will be substantially aligned in a selected angular position of the dial to permit passage of a tool therethrough for mounting the base plate on a supporting structure.

Other objects and advantages will appear from the following specification taken in connection with the accompanying drawings wherein.

Figure 1:
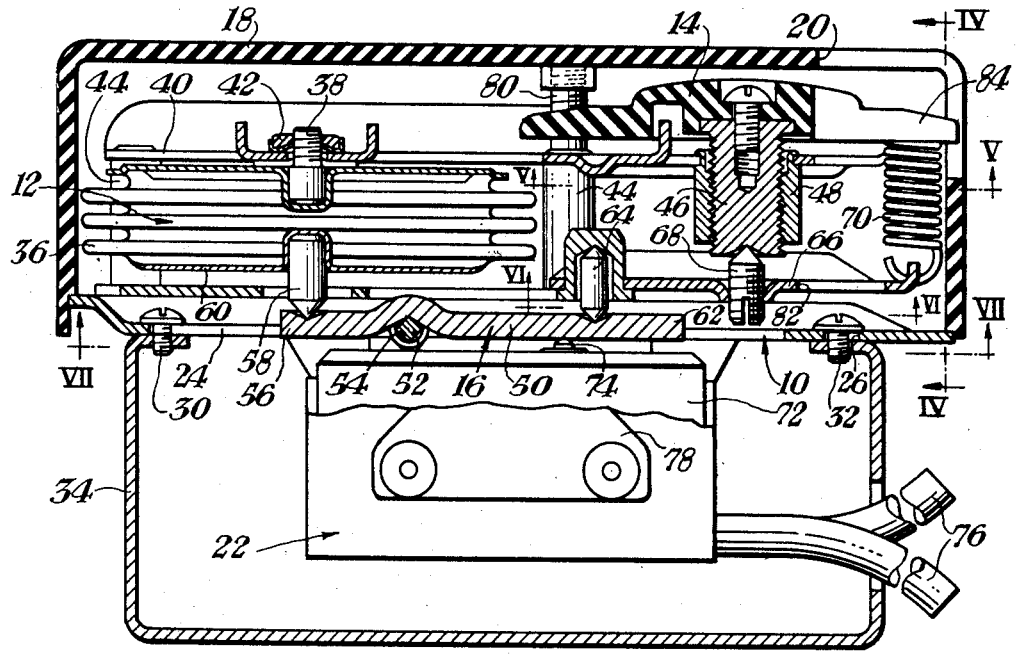
Fig. 1 is a cross-sectional view of a thermostatic control embodying this invention and mounted on a junction box.

Referring more particularly to the drawings, the control device embodying this invention is here shown as comprising a base plate 10 which supports on one side thereof thermally responsive means 12, a rotatable dial 14 and a lever device 16 operatively associated with the dial 14 for setting the temperature to which the thermally responsive means 12 will respond. The thermally responsive means 12, dial 14, and lever device 16 are enclosed within a housing 18 which is secured to the base plate 10 and is provided with an aperture 20 adjacent the dial 14. Supported on the other side of the base plate 10 is switch means 22 which is operatively associated with the lever device 16 to be actuated thereby.

Figure 7:
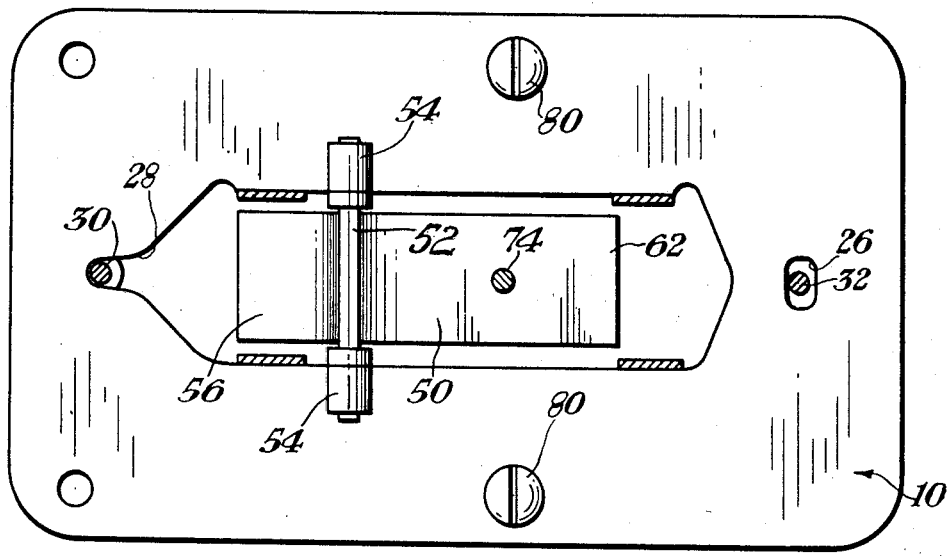
Fig. 7 is a sectional view taken on the line VII—VII of Fig. 1.

As best shown in Figs. 1 and 7, the base plate 10 is generally planar in form and is provided with a pair of apertures 24, 26 which are spaced from each other and are disposed along the longitudinal axis of the plate. The aperture 24 is generally rectangular and relatively large for receiving a portion of the lever device 16 as will more fully appear hereinafter. One end 28 of the aperture 24 takes the form of a relatively narrow notch proportioned to receive the shank of a mounting screw while preventing withdrawal of the head of a mounting screw therethrough. This type of aperture is well known in the art as the "keyhole" type which permits a mounting plate to be secured on a mounting screw by positioning the plate so that the head of the screw passes through the larger part of the aperture and then moving the plate to bring the notch 28 into engagement with the shank of the mounting screw.

The aperture 26 is proportioned to permit passage of the shank of a mounting screw therethrough but prevent passage of the head of such screw and is spaced from the end 28 of the aperture 24 a distance equal to the spacing between a pair of mounting screws 30, 32 of a standard junction box 34.

The thermally responsive means 12 is here shown as comprising an expansible corrugated metallic bellows 36 containing a suitable vapor and having a mounting stud 38 secured to one end thereof. The stud 38 extends through a second plate 40 and a nut 42 threaded on the stud 38 serves to hold the one end of the bellows 36 firmly to the plate 40. The plate 40 is substantially co-extensive with the base plate 10 and is held in parallel spaced relation therewith by a plurality (here shown as four) of hollow columns 44.

The dial 14 is positioned laterally of the bellows 36 and includes an axially extending threaded stud 46 which is threaded into a bushing 48 secured to the plate 40 and extending parallel to the axis of the bellows 36.

The lever device 16 includes a first lever 50 disposed within the aperture 24 in the base plate 10 and pivoted on a pin 52. The pin 52 extends transversely of the aperture 24 and is seated in a pair of oppositely disposed dwells 54 formed in the base plate 10. One end 56 of the lever 50 engages a pointed thrust element 58 seated in the movable end wall 60 of the bellows 36. The other end 62 of the lever 50 engages a thrust element 64 which is pointed at either end and seated in a suitable recess formed in one end of a second lever 66.

Figure 6:
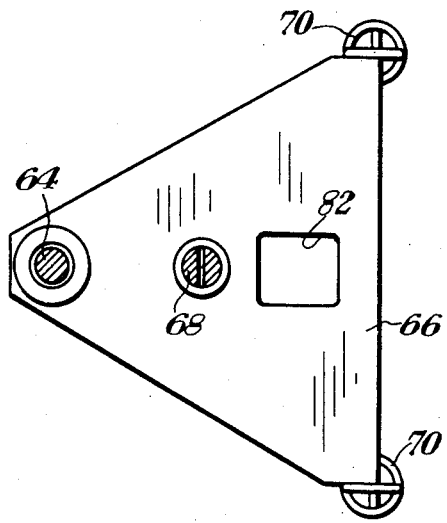
Fig 6 is a fragmentary sectional view taken on the line VI—VI of Fig. 1.

As best shown in Figs. 1 and 6, the lever 66 is generally triangular in form with the thrust element 64 engaging the same adjacent the apex thereof. Centrally disposed in the lever 66 is an adjustable pivot in the form of a screw 68 threaded through the lever 66 and extending into pivotal engagement with the stud 46 of the dial 14. A pair of coil springs 70 secured to opposite corners of the triangular lever 66 are connected to the plate 40 and serve to pivot the lever 66 about the screw 68, urging the thrust element 64 into engagement with the lever 50. It will be apparent that rotational movement of the dial 14 will screw the stud 46 into or out of the bushing 48 to adjust the position of the fulcrum of the lever 66 thereby adjusting the elongation of the springs 70 and controlling the load applied to the bellows 36 through the thrust element 64, lever 50 and thrust element 58.

The switch means 22 is here shown as comprising a snap acting switch mechanism (not shown) preferably of the "microswitch" type and disposed within a casing 72. As is customary in devices of this type, an operating plunger 74 extends out of the casing 72 and is adapted, when reciprocated, to actuate the switch mechanism within the casing 72 to open and close one or more circuits which include two or more leads 76. The switch casing 72 is supported by the base plate 10, being secured to a pair of lugs 78 which are formed on the base plate 10.

The switch casing 72 is positioned with the actuating plunger 74 of the switch mechanism extending into engagement with the lever 50 to be reciprocated thereby upon pivotal movement of the lever 50 about the pin 52. Thus, upon a rise in the temperature of a medium being controlled, the bellows 36 will expand to move the thrust element 58 downward as viewed in Fig. 1 causing counterclockwise rotation of the lever 50 and clockwise rotation of the lever 66 against the bias of the springs 70. Such counterclockwise rotation of the lever 50 will permit the operating plunger 74 to move out of the casing 72 thereby permitting movement of the switching means 22 from one controlling position to another. Upon a drop in the temperature of the medium being controlled, the bellows 36 will contract, permitting the springs 70 to rotate the lever 66 in a counterclockwise direction, as viewed in Fig. 1, and to move the lever 50 in a clockwise direction. Such movement of the lever 50 will force the operating plunger 74 into the switch casing 72 to cause return movement of the switching means to its first controlling position.

It is to be noted that with the lever arrangement disclosed herein, the position at which the lever 50 actuates the switch mechanism will never vary. Accordingly, the length of the bellows 36 when the switch means 22 is actuated will always be the same so that the spring rate of the bellows will not affect the calibration of the dial 14.

Figure 2:
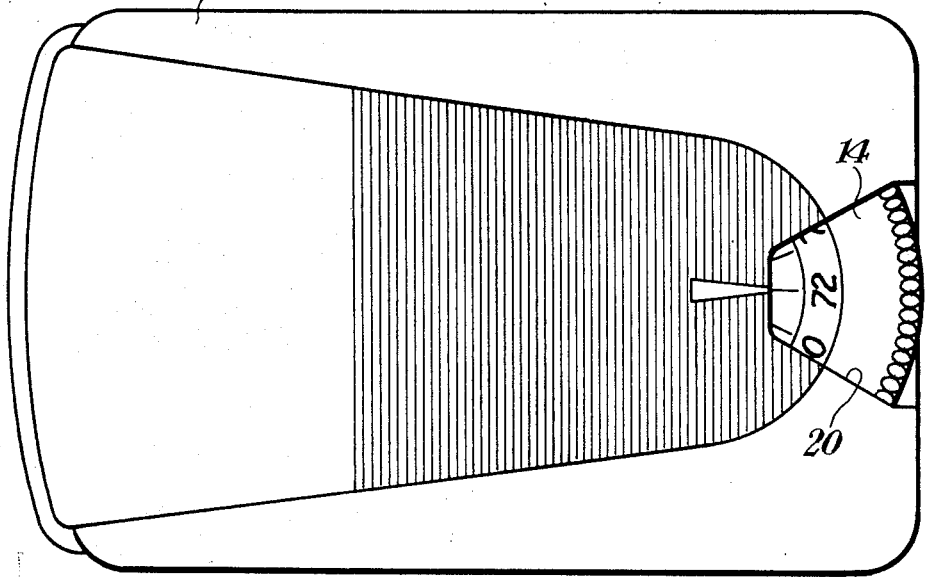
Fig. 2 is a top view of the device shown in Fig. 1 with the parts thereof in different operating positions.
Figure 3:
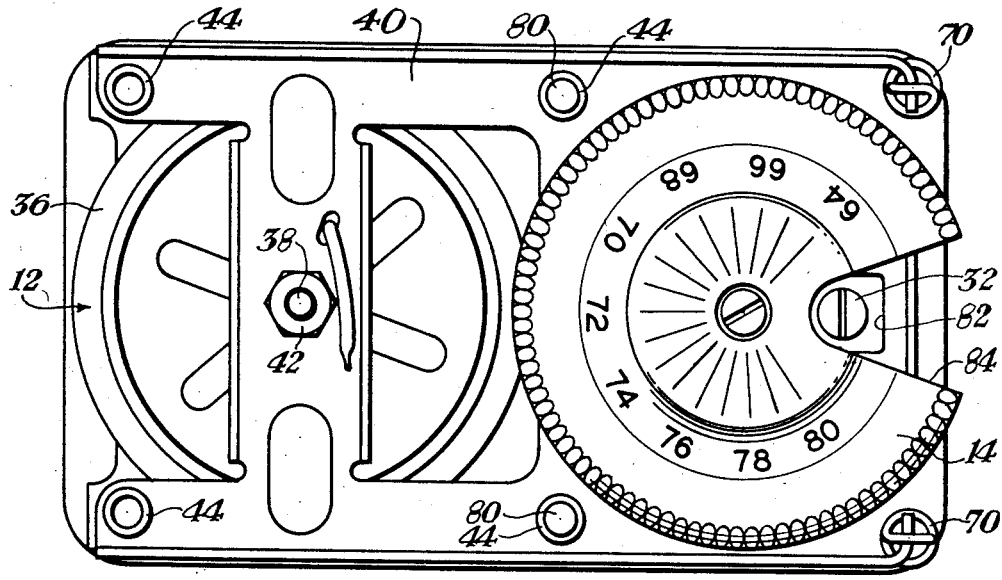
Fig. 3 is a top view of the device shown in Fig. 1 with the housing cover removed.
Figure 4:
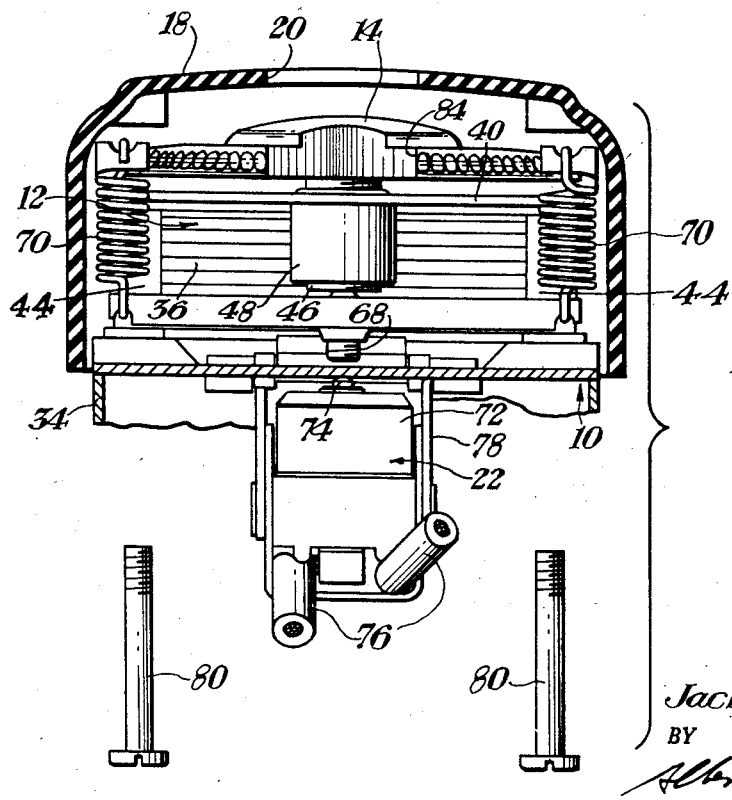
Fig. 4 is a sectional view taken on the line IV—IV of Fig. 1.
Figure 5:
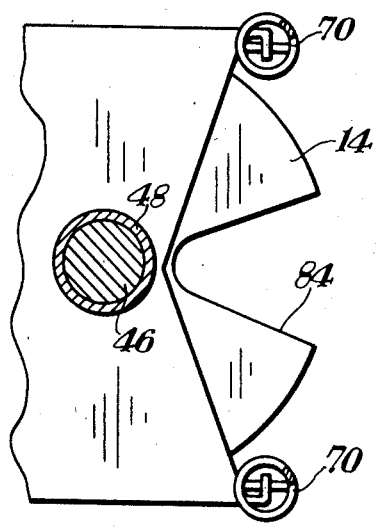
Fig. 5 is a fragmentary sectional view taken on the line V—V of Fig. 1.

An important advantage of this invention arises from the fact that the temperature responsive means 12, dial 14, and lever device 16 may be mounted on the base plate 10 and enclosed within the housing 18 at the time of assembly at the factory and the housing 18 need not thereafter be removed to effect mounting of the control device on a junction box mounted in a wall. The housing 18 is formed to abut the base plate 10 and is held firmly against the same by a pair of screws 80 which extend through a pair of the hollow columns 44 and are threaded into suitable bosses formed on the inner surface of the housing 18. The screws 80 are thus not visible when the control device is mounted on a wall and do not detract from the appearance of the device as shown in Fig. 2.

To provide access to the mounting screw 32 without the necessity for removing any parts of the control device, an aperture 82 is formed in the triangular lever 66 in substantial alignment with the aperture 26 formed in the base plate 10 and the aperture 20 formed in the housing 18. A V-shaped notch or aperture 84 is formed in the dial 14 and is adapted to be aligned with the apertures 82, 26, 20 in a selected angular position of the dial 14. Such selected angular position of the dial is preferably a position outside the range of normal settings of the dial for a purpose which will more fully appear hereinafter. However, it will be apparent that when the dial 14 is in such selected angular position as shown in Figs. 1, 3, 4 and 5, a tool, such as a screw driver, may be inserted through the aperture 20 in the housing 18, the aperture 84 in the knob 14, and the aperture 82 in the lever 66, to manipulate the screw 32 positioned in the aperture 26 in the plate 10.

To effect mounting of the control device on the junction box 34, the mounting screw 30 is first threaded into the junction box 34. The complete assembly of the base plate 10, housing 18, and mechanism contained therein is then positioned against the bearing surfaces of the junction box 34, or against the wall, with the head of the mounting screw 30 extending through the aperture 24 in the base plate 10. Movement of such assembly to the right as viewed in Fig. 1 will position the shank of the mounting screw 30 in the slot 28 forming the end of the aperture 24 and will position the aperture 26 in a position to receive the other mounting screw 32. The mounting screw 32 is then inserted through the aperture 20 of the housing 18, the aperture 84 of the knob 14, the aperture 82 of the lever 66, and the aperture 26 of the base plate 10 to a position where it may be screwed into the junction box 34 to hold the base plate 10 securely thereon.

The dial 14 may then be rotated to a setting within its normal range wherein the aperture 84 is positioned out of alignment with the aperture 20 of the housing 18 to effectively hide the mounting screw 32. The control device is then securely mounted on a junction box and the mounting means are invisible as shown in Fig. 2 of the drawings.

It will now be observed that the present invention provides an improved construction and arrangement of elements in a control device and permits the mounting of a housing containing a control device on a junction box by means accessible from the exterior of the housing but invisible under normal operating conditions.

While a single embodiment of the invention is illustrated and described, it will be understood that changes may be made in the construction and arrangement of elements without departing from the spirit or scope of the invention which is defined by the appended claims.

It is claimed and desired to secure by Letters Patent:

1. A control device adapted to be mounted on a supporting member having a pair of mounting elements, comprising a base plate having a pair of apertures for respectively receiving the pair of mounting elements, temperature responsive means supported by said plate, means including a rotatable dial supported by said plate for adjusting said temperature responsive means, said dial overlying one of said apertures and having a third aperture formed therein, said third aperture being adapted for substantial alignment with said one aperture in a selected position of said dial to permit a mounting element to be inserted therethrough.

2. A control device as claimed in claim 1 wherein the other of said pair of apertures is formed with a portion thereof sufficiently large to permit passage of a mounting element therethrough and another portion thereof sufficiently small to prevent passage of a portion of a mounting element therethrough.

3. A control device as claimed in claim 2 wherein a housing is secured to said plate to encompass said dial and said thermally responsive means, said housing having an aperture formed therein in substantial alignment with said one aperture.

4. A control device adapted to be mounted on a junction box having a pair of mounting screws, comprising a base plate having a pair of apertures for respectively receiving the pair of mounting screws, temperature responsive means supported by said plate, a rotatable dial supported by said plate, said dial overlying one of said apertures and having a third aperture formed therein, said third aperture being adapted for substantial alignment with said one aperture in a selected position of said dial, a lever device interposed between said dial and said temperature responsive means for adjusting said temperature responsive means upon rotation of said dial, said lever device including a lever overlying said one aperture and having a fourth aperture formed therein in substantial alignment with said one aperture.

5. A control device as claimed in claim 4 wherein the other of said pair of apertures is formed with a portion thereof sufficiently large to permit passage of the head of a mounting screw therethrough and another portion thereof sufficiently small to prevent passage of the head of a mounting screw therethrough.

6. A control device as claimed in claim 5 wherein a housing is secured to said plate to encompass said dial and said thermally responsive means, said housing having an aperture formed therein in substantial alignment with said one aperture.

7. A control device adapted to be mounted on a junction box having a pair of mounting screws, comprising a base plate having a pair of apertures for respectively receiving the pair of mounting screws, temperature responsive means including an expansible element supported by said plate, a first lever pivoted on said plate and operatively connected to said expansible element to be movable in one direction thereby, means for biasing said first lever in another direction, said last named means including a second lever operatively engageable with said first lever and having a third aperture formed therein in substantial alignment with one of said pair of apertures, an adjustable fulcrum for said second lever, a rotatable dial for adjusting said fulcrum and having a fourth aperture formed therein, said fourth aperture being adapted for substantial alignment with said one aperture in a selected angular position of said dial, and spring means for biasing said second lever into operative engagement with said first lever, and switch means operatively associated with one of said levers to be actuated thereby.

8. A control device comprising temperature responsive means including an expansible element, a lever operatively connected to said expansible element to be movable in one direction thereby, a second lever, an adjustable fulcrum for said second lever, a rotatable dial for adjusting said fulcrum, spring means for biasing said second lever into operative engagement with the first said lever and said fulcrum to urge the same in another direction, the biasing force of said spring means being variable by adjustment of said fulcrum, and switch means operatively associated with one of said levers to be actuated thereby.

9. A control device comprising temperature responsive means including an expansible element, a lever operatively connected to said expansible element to be movable thereby, switch means operatively associated with said lever to be actuated thereby, a second lever operatively engaging the first said lever, an adjustable fulcrum for said second lever, spring means biasing said second lever into engagement with said fulcrum and the first said lever whereby said expansible element must exert a force on the first said lever sufficient to overcome the biasing force of said spring means to move the first said lever, and a mmeber for adjusting the position of said fulcrum to vary the biasing force of said spring means on said second lever.

10. A control device comprising a base, temperature responsive means including an expansible element supported by said base, a first lever pivoted on said base and connected to said expansible element to be movable in one direction thereby, switch means operatively associated with said lever to be actuated thereby, a second lever engaging the first said lever, an adjustable fulcrum for said second lever, spring means supported by said base and connected to said second lever, said spring means being operative to bias said second lever into engagement with said fulcrum and the first said lever to tend to rotate said second lever on said fulcrum and urge the first said lever in a direction opposite to said one direction, and a rotatable dial associated with said fulcrum and operative upon rotation thereof to vary the position of said fulcrum thereby varying the position of said second lever and the biasing force of said spring means.

11. A control device adapted to be mounted on a supporting member having a plurality of mounting elements, comprising a base having a plurality of apertures for respectively receiving a plurality of mounting elements, temperature responsive means supported by said base, means including a rotatable dial supported by said base for adjusting said temperature responsive means, said dial overlying one of said apertures and having an opening formed therein, said opening being adapted for substantial alignment with said one aperture in a selected position of said dial to permit a mounting element to be inserted therethrough.

12. A control device adapted to be mounted on a supporting member having at least one detachable mounting element, comprising a base having an aperture for receiving the mounting element, controlling means supported by said base, means including a rotatable dial supported by said base for adjusting said controlling means, said dial overlying said aperture and having an opening formed therein, said opening being adapted for substantial alignment with said aperture in a selected position of said dial to permit a mounting element to be inserted therethrough.

References Cited in the file of this patent

UNITED STATES PATENTS

| | | |
|---|---|---|
| 1,660,256 | Cowley | Feb. 21, 1928 |
| 2,403,824 | Newell | July 9, 1946 |
| 2,446,961 | Sherlock | Aug. 10, 1948 |
| 2,465,830 | Andersson | Mar. 29, 1949 |
| 2,562,385 | Marcellus | July 31, 1951 |
| 2,565,890 | Smith | Aug. 28, 1951 |
| 2,626,183 | Jacobs | Jan. 20, 1953 |